(12) United States Patent
Ortner et al.

(10) Patent No.: US 9,782,039 B2
(45) Date of Patent: Oct. 10, 2017

(54) GRIDDLE

(71) Applicant: Viking Range, LLC, Greenwood, MS (US)

(72) Inventors: Matthew L Ortner, Greenwood, MS (US); Michael C Milner, Greenwood, MS (US)

(73) Assignee: Viking Range, LLC, Greenwood, MS (US)

(*) Notice: Subject to any disclaimer, the term of this patent is extended or adjusted under 35 U.S.C. 154(b) by 637 days.

(21) Appl. No.: 14/286,514

(22) Filed: May 23, 2014

(65) Prior Publication Data

US 2015/0335198 A1    Nov. 26, 2015

(51) Int. Cl.
*A47J 37/06* (2006.01)
*A47J 27/58* (2006.01)

(52) U.S. Cl.
CPC .............. *A47J 37/067* (2013.01); *A47J 27/58* (2013.01)

(58) Field of Classification Search
CPC    A47J 27/58; A47J 37/06; A47J 37/067; A47J 37/0676; A47J 37/0682
USPC ......................................................... 99/425
See application file for complete search history.

(56) References Cited

U.S. PATENT DOCUMENTS

| | | | |
|---|---|---|---|
| 1,748,742 A * | 2/1930 | Thomson | F24C 3/027 126/211 |
| 3,994,211 A | 11/1976 | Stanek | |
| 4,119,021 A * | 10/1978 | Moses | F24C 15/18 126/215 |
| 4,245,147 A | 1/1981 | Cummings et al. | |
| 4,633,772 A | 1/1987 | Bowden et al. | |
| 4,724,826 A * | 2/1988 | Muramatsu | F24J 2/0488 126/636 |
| 4,895,131 A | 1/1990 | Overholser | |
| 5,413,032 A | 5/1995 | Bruno et al. | |
| 5,676,043 A | 10/1997 | Best | |
| 5,678,531 A | 10/1997 | Byers et al. | |
| 7,647,866 B2 | 1/2010 | Button | |
| 8,074,563 B2 | 12/2011 | Bowles et al. | |
| 8,757,052 B2 | 6/2014 | Hess et al. | |
| 2006/0016348 A1* | 1/2006 | Babington | A47J 37/0781 99/422 |
| 2010/0175682 A1* | 7/2010 | Erikson | A47J 37/067 126/25 R |

* cited by examiner

*Primary Examiner* — Thien S Tran
(74) *Attorney, Agent, or Firm* — Baker, Donelson, Bearman, Caldwell & Berkowitz, PC; Dorian Kennedy

(57) ABSTRACT

A griddle (10) is disclosed which includes a base (11) and a griddle plate (13). The base includes a frame (15) and a removable grease trough (16). The frame includes sidewalls (18) with top surface (22) having a grease collection channel (23) with a capture hole (24) located so that liquids within the grease collection channel flow through the grease capture hole and into the grease trough. The base has a grease trough well (26) configured to receive the grease trough therein. The grease trough includes a trough collection catch (28) with a sump (32), a handle base (29), and a thermally insulative handle or handle insert (30). The griddle plate has a top surface (38) and a stepped bottom surface (39) defined by a peripheral side edge (40). The stepped bottom surface includes a groove (44) which forms a drip edge (45) positioned above the grease collection channel.

26 Claims, 4 Drawing Sheets

GRIDDLE

TECHNICAL FIELD

This invention relates generally to griddles, and more particularly to griddles having food juices collection capabilities.

BACKGROUND OF THE INVENTION

Griddles used for cooking food have existed for many years. These cooking griddles typically include a generally flat cooking surface which is positioned above a gas burner or heating element incorporated into the griddle or separate and apart from the griddle such as in a cooktop. The cooking surface may be elevated above a peripheral channel which collects any food juices, such as grease, coming from the cooked food.

A problem with these types of griddles has been the disposal of the collected food juices once the cooking process is completed. Oftentimes, the entire cooking surface must be carefully removed, transported and then tilted to pour the captured food juices from the peripheral trough. This task can be difficult due to the temperature of the griddle handle and the large area of the cooking surface to negotiate during its movement and pouring process.

Accordingly, there is a need in the art for a griddle from which it will be easier to capture and later expel the captured food juices. It is to the provision of such therefore that the present invention is primarily directed.

SUMMARY OF THE INVENTION

In a preferred form of the invention a griddle comprises a base having a cooking area defined by side edges, a collection channel positioned below at least a portion of the cooking area side edges and having an exit port, and a trough well having at least a portion positioned below the collection channel exit port. The griddle also includes a collection catch removably mounted within the base trough well. The collection catch has a collection sump positionable within the trough well below the collection channel exit port.

DETAILED DESCRIPTION

Figure 1:
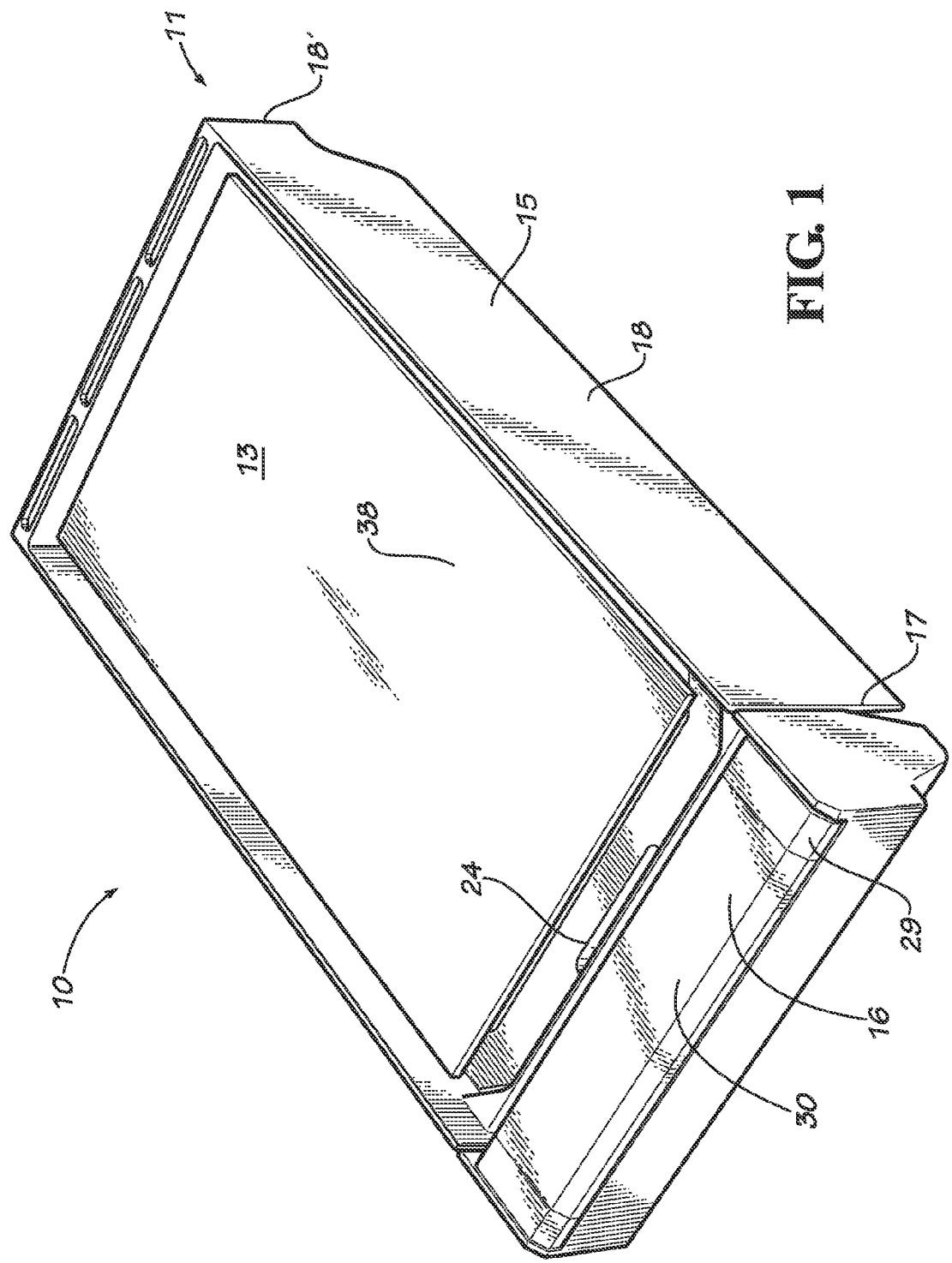
FIG. 1 is a perspective view of the griddle embodying principles of the invention in a preferred form.
Figure 2:
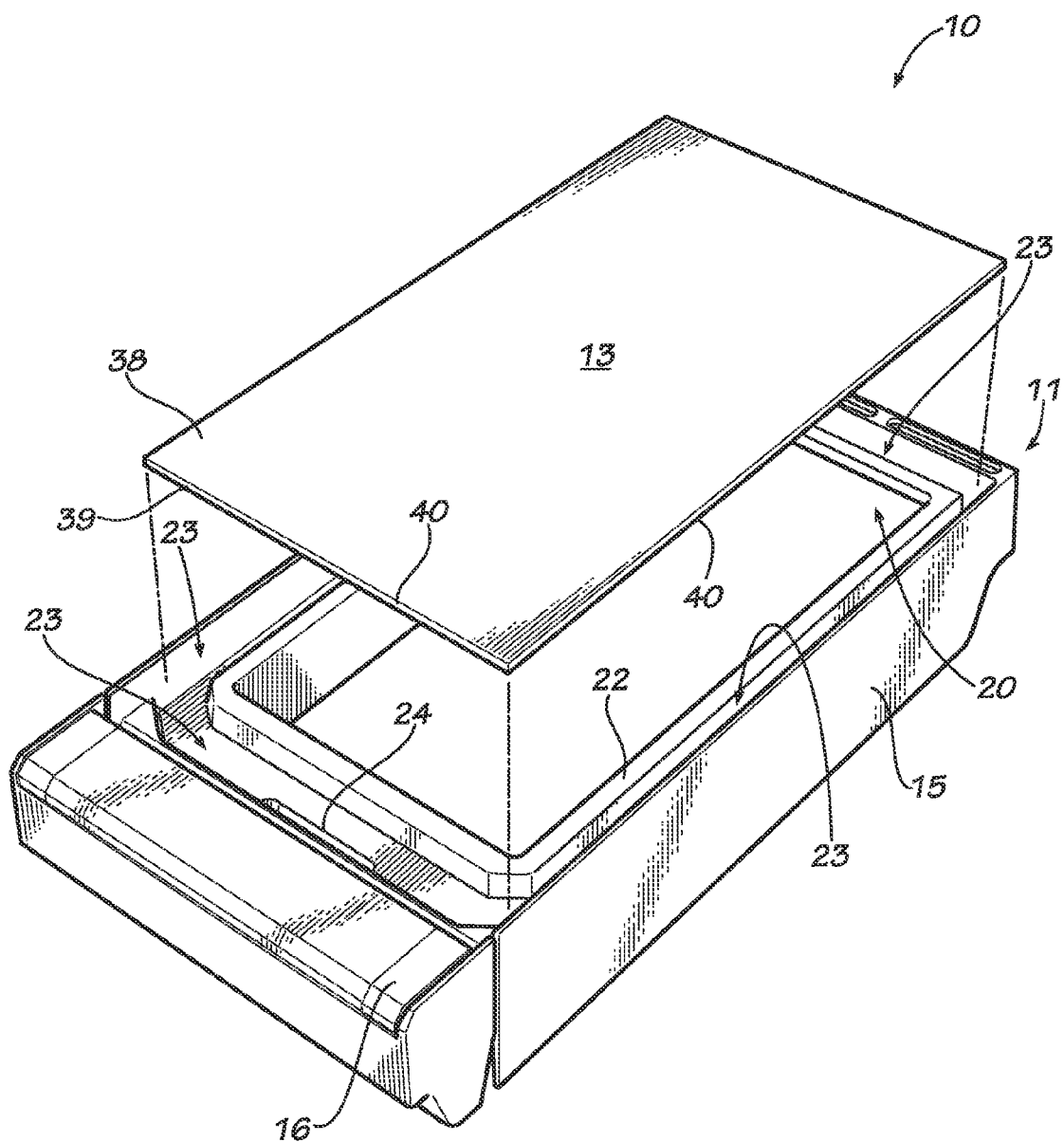
FIG. 2 is an exploded, perspective view of the griddle of FIG. 1, shown with a griddle plate removed from a base.

With reference next to the drawings, there is shown a griddle 10 according to the present invention. The griddle 10 includes a peripheral base 11, made of a metal such as aluminum. The griddle 10 also includes a cooking area or griddle plate 13 removably mounted to the base 11.

The base 11 includes a peripheral frame 15 and a grease trough or drip tray 16 removably mounted to a front end 17 of the frame 15. The frame 15 includes four peripheral sidewalls 18 which form a bottom recess 19 extending to a top opening 20. The rear sidewall 18' opposite the front end 17 preferably has a shorter overall height than the other three sidewalls so that the heat captured within the bottom recess 19 escapes below the rear sidewall 18' and away from the user. The frame 15 also has a top surface 22 which includes a downwardly extending peripheral grease collection channel 23. The term grease as used herein is intended to encompass all types of food juices produced while cooking them. The grease collection channel 23 is sloped or tilted downwardly towards a grease exit port or capture hole 24 located adjacent the grease trough 16, so that liquids contained within the grease collection channel 23 flow towards and through the grease capture hole 24. The front end 17 of the base 11 has a generally L-shaped grease trough receptacle or well 26 which is configured to receive the grease trough 16 therein. The grease trough well 26 may be removably mounted to the rest of the frame to enable it to be separated for better cleaning.

Figure 3:
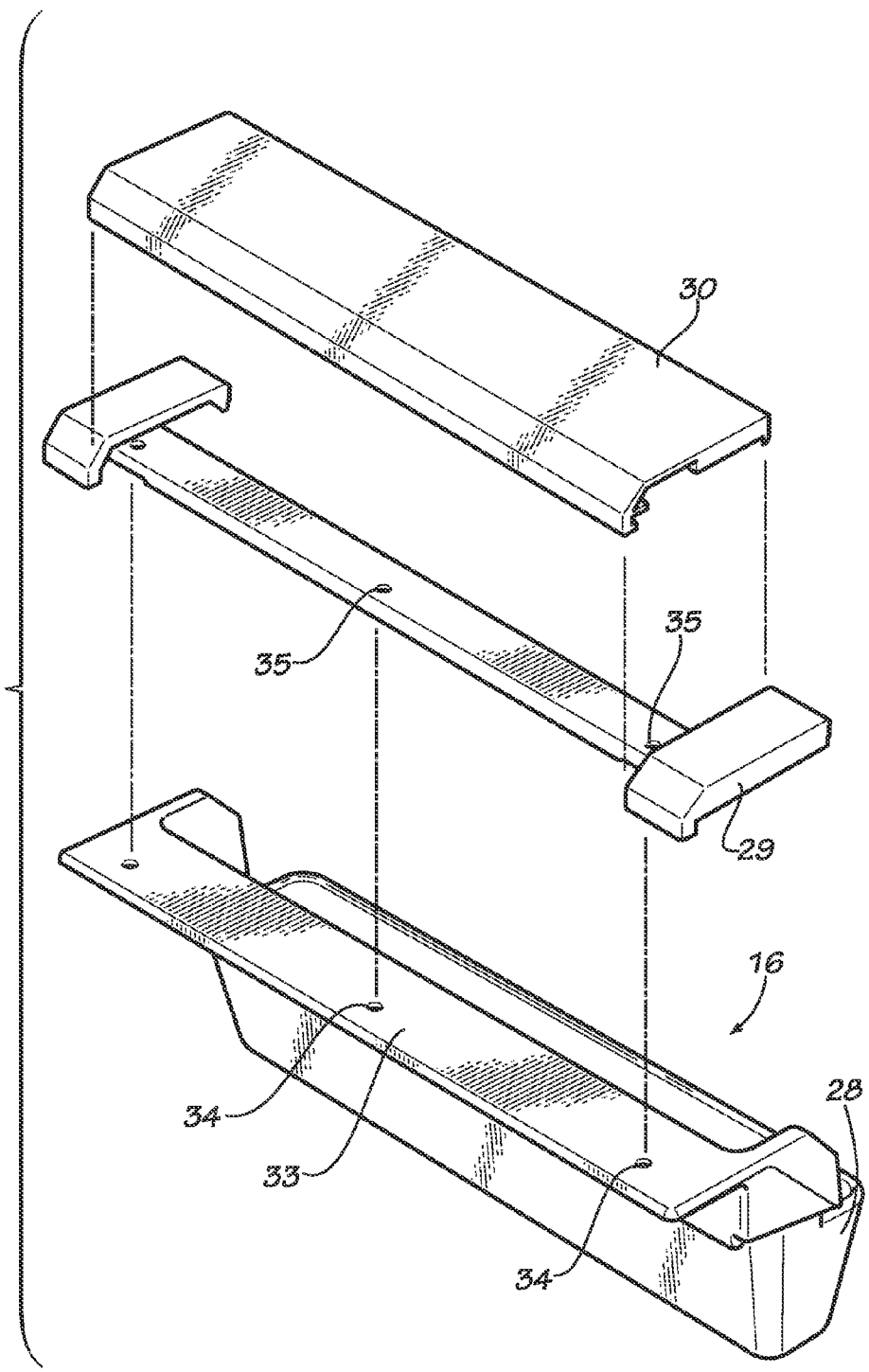
FIG. 3 is an exploded, perspective view of a grease trough of the griddle of FIG. 1.

The grease trough 16 includes a trough collection catch 28, a handle base 29, and a thermally insulative handle or handle insert 30, as best shown in FIG. 3. The grease trough collection catch 28 has a lower collection sump 32 extending from an upper, handle flange 33. The trough collection catch 28 and handle base 29 are made of a metal such as aluminum. The trough collection catch handle flange 33 has three mounting screw holes 34 which are aligned with mounting screw holes 35 within the handle base 29. Mounting screws 36 pass through screw holes 34 and 35 and thereby couple the handle base 29 to the trough collection catch 28. The handle insert 30 is made of a thermally insulative, heat resistant plastic or the like, and is preferably snap-fitted onto the handle base 29. T h e grease trough 16 is configured to be movable within the grease trough well 26 between a first, in-use position, shown in FIG. 4, a second, disengaged position, shown in FIG. 5, and a third, removed position, as shown in FIG. 6. The handle insert 30 extends over the collection sump 32 to provide a grip or gripping area for the user. With the grease trough 16 in its in-use position, the collection sump 32 is positioned below the grease capture hole 24 so that food juices passing through the grease capture hole 24 are deposited into the underlying collection sump 32. Additionally, while in the in-use position the handle insert 30 abuts the front sidewall 18" so as to cover the exposed or open top area of the underlying trough catch to prevent direct access to the grease captured therein and prevent the splattering of grease from the grease trough onto the user and the surrounding area, as best shown in FIG. 1 wherein the handle insert is depicted substantially flush with or abutting the front wall and the remaining portions of the grease trough 16 are obscured from view by the handle insert.

The griddle plate 13 is generally planar with a top surface 38 and a stepped bottom surface 39 defined by a peripheral side edge 40. Both the top surface and the bottom surface may be a cooking surface with different surface configurations, depending upon which surface is facing upwardly during the cooking process. The stepped bottom surface 39 includes a peripheral margin area 42 and a thicker central area 43. The margin area 42 includes an upwardly extending groove 44 which forms, in combination with the peripheral side edge 40, a peripheral drip lip or edge 45. The drip edge 45 is positioned directly above the grease collection channel 23. The griddle plate central area 43 is configured to be received or nested within the top opening 20, which aids in maintaining the position of the griddle plate 13 relative to the underlying base 11. The griddle plate 13 is preferably made of a high thermally conductive metal, such as a chrome plated stainless steel.

In use, the griddle 10 is positioned over the heat source, such as a gas burner, of a cooktop. Preferably, the griddle 10 is positioned over the gas burner with the normal or customary burner grates removed, i.e., the griddle replaces the burner grates and does not rest upon them. The griddle sidewalls 18 act to trap the majority of the heat within the bottom recess 19 so that an even heat is applied to the overlaying griddle plate 13.

As food is cooked upon the griddle plate 13, grease and/or other types of food juices flow over the top surface 38 of the griddle plate 13. As these juices reach the peripheral side edge 40 of the griddle plate, the juices flow downwardly along the side edge 40 and upon reaching the margin bottom surface 39 the juices drip or drop into the underlying grease collection channel 23. If the juice somewhat adheres to the margin bottom surface 39 the peripheral groove 44 or undercut described hereinafter, prevents further travel or flow along the bottom surface and thereby causes the juices to drop or drip, i.e., the groove 44 forms the drip edge 45 which prevents juices from flowing along the bottom surface 39 of the griddle plate 13.

As the juice drop into the grease collection channel 23 it gravitationally flows through the sloped grease collection channel 23 towards the lower positioned grease capture hole 24. The juice then flows through the grease capture hole 24 and drops into the underlying collection sump 32 of the grease trough 16.

Figure 4:
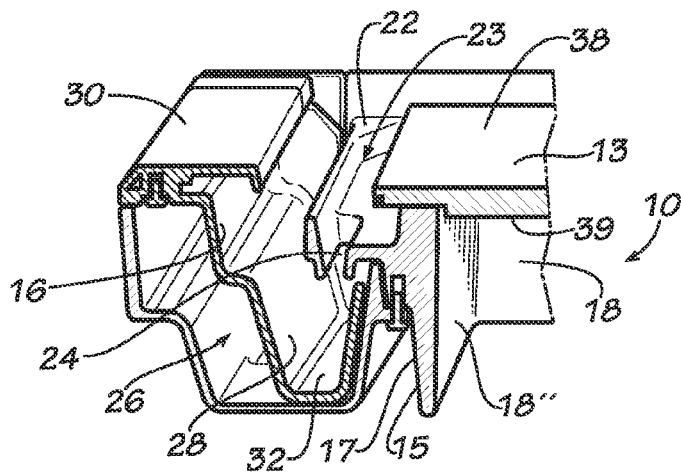
FIGS. 4-6 are a series of cross-sectional view of a portion of the griddle of FIG. 1.
Figure 5:
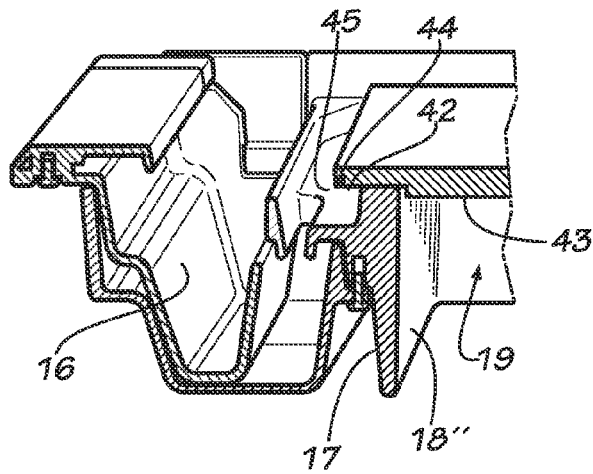
Figure 6:
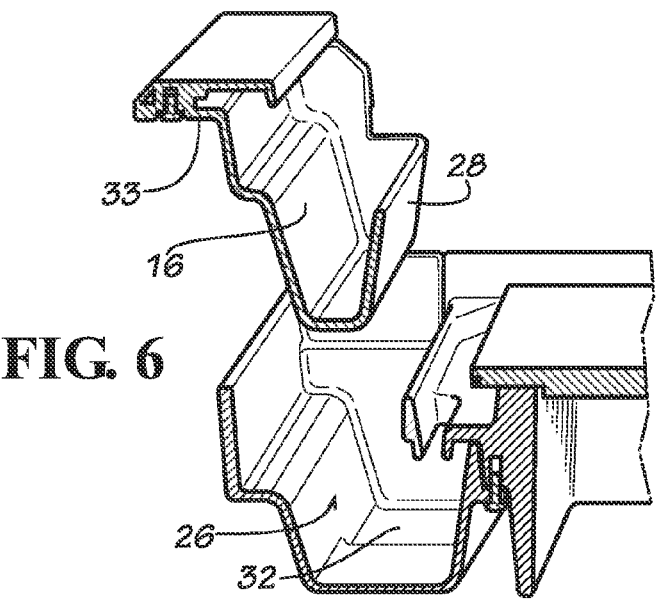

Once the food has completed cooking and the user wishes to remove the juice from the grease trough, the grease trough 16 is simply moved or slid from its collection position, shown in FIG. 4, to a disengaged position, shown in FIG. 5. This is accomplished by moving the grease trough 16 toward the frame front end 17 by pulling or pushing upon the handle insert 30 in this direction. The user then grasps the handle insert 30 and lifts the grease trough 16 from the grease trough well 26 to its completely removed position separate and apart from the base 11, as shown in FIG. 6. The juice within the grease trough collection sump 32 may then be poured out of the collection sump and properly disposed.

The thermally insulative characteristics of the handle insert 30 allows the grease trough 16 to be handled immediately after the cooking process is complete, as heat is restricted from being transferred from the grease trough to the user's hands. This is a vast improvement over prior art griddles that utilize metal handles which get hot with the use of the griddle, making them difficult to grasp and handle. This ability to handle the grease trough while still hot allows for better clean-up and disposal of juices, such as grease, as such juices flow better while at a high temperature.

Figure 7:
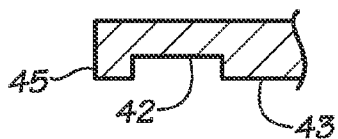
FIG. 7 is a cross-sectional side view of a portion of a griddle plate in another preferred form of the invention.

It should be understood that as an alternative to the groove 44, a portion of the griddle plate spaced from the side edge 40 may be undercut so that the side edge 40 depends lower than the undercut portion to form the downwardly extending drip lip, as shown in FIG. 7.

It should be understood that even though the description herein primarily refers to a gas burner, any alternative heat form may also be utilized, such as charcoal, electric heating elements, and other conventionally known heating means.

It should be understood that as an alternative to the use of the griddle atop an existing burner, a heat source may be incorporated into the griddle so that it is a stand alone structure.

Last, it should be understood that the removable feature of the griddle plate, while desirable to enable different types of griddle plates to be used and switched at any time, is not mandatory to the invention. However, the removable feature is also desirous as this allows for the use of multiple griddle plates of different surface configurations to be used.

While this invention has been described in detail with particular reference to the preferred embodiments thereof and the best mode of practicing same, it will be understood that variations and modifications can be effected within the spirit and scope of the invention as described herein above and as set forth in the appended claims.

The invention claimed is:

1. A griddle comprising:
a base having a cooking area defined by side edges, an elongated collection channel positioned below at least a portion of said cooking area side edges and having an exit port, and an elongated trough well having at least a portion positioned below said collection channel exit port, said elongated trough well defining an interior space having a longitudinal length along the elongated direction and a lateral width in a direction generally normal to said longitudinal length, and
an elongated collection catch removably mounted within said base trough well, said collection catch having an elongated collection sump positionable within said trough well below said collection channel exit port, said elongated sump having a longitudinal length along the elongated direction and a lateral width in a lateral direction generally normal to said longitudinal length, said sump lateral width being sized to allow lateral movement of said elongated collection catch from an in-use position wherein said elongated collection sump is positioned directly below said elongated collection channel and a disengaged position wherein said collection sump is laterally offset from being directly below said elongated collection channel in the lateral direction of said elongated sump.

2. The griddle of claim 1 wherein said trough well is removably coupled to said collection channel.

3. The griddle of claim 1 wherein said collection catch includes a thermally insulative handle.

4. The griddle of claim 3 wherein said thermally insulative handle substantially covers said trough well.

5. The griddle of claim 1 wherein said cooking area is a griddle plate having a top surface and a bottom surface opposite said top surface, and wherein said griddle plate side edges form said bottom surface with a downwardly extending lip.

6. The griddle of claim 5 wherein said lip is formed by an unoccupied groove within said bottom surface positioned closely adjacent to but spaced from said side edges.

7. The griddle of claim 5 wherein said base includes a frame and wherein said griddle plate is removably coupled to said frame.

8. The griddle of claim 1 wherein said collection channel extends below all portions of said cooking area side edges.

9. A griddle comprising:
a base having a cooking surface having an elongated side edge along a longitudinal direction, a collection channel positioned below said elongated side edge of said cooking surface, said collection channel having an exit, and
a collection catch having a collection sump, said collection catch being coupled to said base for lateral movement generally normal to said longitudinal direction of said elongated side edge between a collection position with said collection sump positioned directly below said collection channel exit and a removed position wherein said collection catch is completely separated and apart from said base.

10. The griddle of claim 9 wherein said base includes a well configured to receive said collection catch.

11. The griddle of claim 10 wherein said collection channel is formed by a frame and wherein said base well is removably mounted to said frame.

12. The griddle of claim 10 wherein said base well is configured to receive said collection catch with said collection catch in said collection position and with said collection catch in a disengaged position with said collection catch residing within said well but moved to a position wherein said collection sump is not position below said collection channel exit.

13. The griddle of claim 9 wherein said collection catch includes a thermally insulative handle.

14. The griddle of claim 13 wherein said base includes a well configured to receive said collection catch and wherein said thermally insulative handle substantially covers said well.

15. The griddle of claim 9 wherein said cooking surface is a griddle plate having a top surface, a bottom surface opposite said top surface and side edges extending between said top surface and said bottom surface, and wherein said griddle plate side edges and said bottom surface forms a downwardly extending lip.

16. The griddle of claim 15 wherein said lip is formed by an unoccupied groove within said bottom surface positioned closely adjacent to but spaced from said side edges.

17. The griddle of claim 15 wherein said base includes a frame and wherein said griddle plate is removably coupled to said frame.

18. The griddle of claim 9 wherein said collection channel extends completely around said cooking surface.

19. A griddle comprising:
a base having peripheral sidewalls forming a base top opening and a base top surface having a collection channel with an exit port, said base also having a collection trough receptacle adjacent said exit port;
a griddle plate positioned over said base top opening and having side edges positioned above said collection channel of said base, and
an elongated collection trough having a longitudinal length along a longitudinal direction and configured to be received within said base collection trough receptacle, said collection trough being laterally movable in a lateral direction generally normal to said longitudinal direction between a first position aligned to collect liquids passing through said exit port and a second laterally offset position disengaged from said base.

20. The griddle of claim 19 wherein said collection trough receptacle is removably mounted to one said peripheral sidewall.

21. The griddle of claim 19 wherein said collection trough includes a thermally insulative handle.

22. The griddle of claim 21 wherein said thermally insulative handle substantially covers said collection trough receptacle.

23. The griddle of claim 19 wherein said griddle plate has a top surface and a bottom surface opposite said top surface, and wherein said griddle plate side edges and said bottom surface in combination form a downwardly extending lip.

24. The griddle of claim 23 wherein said lip is formed by an unoccupied groove within said bottom surface positioned closely adjacent to but spaced from said side edges.

25. The griddle of claim 19 wherein said griddle plate is removably coupled to said base.

26. The griddle of claim 19 wherein said collection channel extends below all side edges of said griddle plate.

* * * * *